United States Patent [19]

Stemmler

[11] Patent Number: 4,647,837

[45] Date of Patent: Mar. 3, 1987

[54] REACTIVE-POWER COMPENSATOR FOR COMPENSATING A REACTIVE-CURRENT COMPONENT IN AN ALTERNATING-VOLTAGE SYSTEM

[75] Inventor: Herbert Stemmler, Kirchdorf, Switzerland

[73] Assignee: BBC Brown, Boveri & Company, Limited, Baden, Switzerland

[21] Appl. No.: 656,888

[22] Filed: Oct. 2, 1984

[30] Foreign Application Priority Data

Oct. 12, 1983 [CH] Switzerland ............ 5548/83-0

[51] Int. Cl.$^4$ ............................................. H02J 3/18
[52] U.S. Cl. ............................................. 323/207; 363/41
[58] Field of Search .................. 323/205, 207, 217; 363/37, 41, 58, 71

[56] References Cited

U.S. PATENT DOCUMENTS

| 3,959,719 | 5/1976 | Espelage .............. | 323/207 |
| 3,959,720 | 5/1976 | Bose et al. ............ | 323/207 |
| 4,019,124 | 4/1977 | Mötgen ................. | 323/207 |

FOREIGN PATENT DOCUMENTS 2643934  1/1978  Fed. Rep. of Germany.

OTHER PUBLICATIONS

F. Harashima et al., "A Closed-Loop Control System for the Reduction of Reactive Power Required by Electronic Converters", *IEEE Transactions on Industrial Electronics & Control Instrumentation*, May, 1976, pp. 162-166.

Gyugyi "Reactive Power Generation & Control by Thyristor Circuits", *IEEE Transactions on Industry Applications*, Sep./Oct. 1979, pp. 521-532.

*Primary Examiner*—Clifford C. Shaw
*Attorney, Agent, or Firm*—Oblon, Fisher, Spivak, McClelland & Maier

[57] ABSTRACT

A reactive-power compensator for compensating a reactive current component in an alternating-voltage system, including a reactive-current converter formed by forced-commutation current converter rectifiers arranged in a current converter bridge circuit, and a smoothing choke used as a termination at the direct-current side of the bridge circuit. The compensator attains constant compensation of both inductive and capacitive reactive-current components with clearly reduced system reaction by driving the rectifiers such that the bridge circuit accepts at its input a compensation current in the form of approximately rectangular current pulses having a pulse frequency greater than that of the alternating voltage system. The polarity and width of these current pulses are modulated in accordance with a sine function so that the compensation current is identical in frequency and amplitude with respect to the reactive current component at the system voltage input, but shifted in phase by 180°.

7 Claims, 11 Drawing Figures

REACTIVE-POWER COMPENSATOR FOR COMPENSATING A REACTIVE-CURRENT COMPONENT IN AN ALTERNATING-VOLTAGE SYSTEM

BACKGROUND OF THE INVENTION

1. Field of the Invention

This invention relates to a reactive power compensator for compensating a reactive-current component in an alternating-voltage system such as is known from the prior art (L. Abraham and M. Hausler: Blindstromkompensation uber Halbleiterschalter oder Umrichter (Reactive-current compensation by means of semiconductor switches or frequency converters), VDE Symposium on electronics, Hannover, 1969, pages 100–114).

2. Description of the Prior Art

The increasing use of electric machines and plant having a higher reactive-current consumption, for example arc furnaces, asynchronous machines or phase-control systems' leads to increasing reactive power requirements on the consumer side of the power supply system. On the one hand, this results in additional loading on the supply system and, on the other hand, makes it more difficult to stabilize voltage fluctuations in the system.

In order to prevent these undesirable effects or at least to reduce them to a tolerable dimension, compensation of the reactive current is increasingly undertaken at its point of origin, that is to say at the load itself. The decentralized type of reactive-current compensation requires use of a plurality of reactive-power compensators which, apart from having as short as possible a recovery time, are especially simple and thus inexpensive to construct and, in addition, provide for continuous compensation of the inductive or capacitive reactive currents occurring.

The reactive-power compensators currently used are usually combinations of switched capacitor banks (TSC: thyristor-switched capacitor) and controllable inductances (TCR: thyristor-controlled reactance). The capacity of the capacitor bank is here dimensioned to the maximum inductive reactive power occurring at the load. Since the capacitor bank can be switched in or out only in steps, the reactive power range between the steps is covered by the controllable inductance (German Offenlegungsschrift No. 1,932,272). In this type of reactive power compensation, the expenditure for the capacitor bank to be installed increases with increasing reactive power of the consumer so that considerable compensator costs must be expected with a high reactive power.

In contrast, in the abovementioned VDE Symposium reference use of a reactive-current converter for compensating reactive power has been proposed which essentially consists of a current converter bridge circuit including current converter rectifiers with forced commutation. The direct-current output of the bridge is terminated by a smoothing choke. At the alternating-voltage input, capacitors are connected in parallel which protect the current converter rectifiers from overvoltages during the forced commutation at the alternating-voltage system encumbered with reactance.

The progress in time of the forced commutation is controlled in this reactive-current converter, designated as "type A", in such a manner that the frequency of the alternating-voltage system is used to generate rectangular blocks of current of alternating polarity, which lead the system voltage by about 90° in the compensation of inductive reactive currents and lag by about 90° in the compensation of capacitive reactive currents.

Although the operation of such a reactive-current converter is possible without the large and expensive capacitor banks needed with other compensation methods, this presents various problems. Firstly, the amplitude of the reactive current emitted or accepted by the current converter can be adjusted only through the magnitude of a difference angle $\alpha$ by which the phase shift between reactive current and system voltage deviates from the ideal value of 90°. The result is that, apart from the desired reactive power, an additional active power of changing amplitude is produced. Secondly, the reactive current converter can change only discontinuously between the inductive and the capacitive operating range, that is to say with a phase jump of 180° so that the control range has large gaps. Finally, the reactive current emitted and accepted in blocks of current has a considerable component of harmonics which must be suppressed by elaborate input filters in order to prevent interfering system reactions.

SUMMARY OF THE INVENTION

Accordingly, the objects of this invention are to provide a novel reactive power compensator in the form of a reactive current converter which, with low expenditure, is continuously controllable over the total inductive and capacitive range of compensation and in which simultaneously the component of harmonics in the reactive current is clearly reduced.

These and other objects are achieved according to the invention by providing a novel reactive-power compensator for compensating a reactive-current component in an alternating-voltage system including a current converter bridge circuit having an alternating-voltage input which is to be connected to the alternating-voltage system and a direct-current output, forced-commutation current converter rectifiers provided in all branches of the alternating-voltage system and arranged such that a defined current direction is produced at the direct-current output, a capacitor connected in parallel to the alternating-voltage input, a smoothing choke connected to the direct-current output, and a compensation circuit for driving the forced-commutation current converter rectifiers such that the current converter bridge circuit accepts at its alternating-voltage input a compensation current in the form of approximately rectangular current pulses having a pulse frequency which is greater than the frequency of the alternating-voltage system, and the polarity and width of the current pulses are modulated in accordance with a sine function such that the fundamental of the compensation current is identical in frequency and amplitude with respect to the reactive-current component but shifted in phase by 180°.

An important apsect of the invention consists in the fact that the drive means for the forced-commutation current-converter rectifiers in the reactive-current converter are selected in such a manner that the reactive current accepted or emitted by the reactive-current converter consists of a sequence of sinusoidal width-modulated blocks or pulses of current and that the pulse frequency is greater than the frequency of the alternating system voltage. The sine function used for width modulation has the same frequency here as the reactive-current component to be compensated but is in each case shifted in phase by 180° with respect to this component.

Such a choice of drive means has the advantage, firstly, that as a result of the sinusoidal width modulation of the current pulses a large fundamental component and only a small harmonics component, which decreases with increasing pulse frequency, is present in the compensation current. An additional advantage is that the amplitude of the fundamental can be continuously varied by a change of the pulse width without changing the phase relationship of the fundamental with respect to the system voltage or the reactive-current component of the system. This produces the third advantage of a continuous transition between the inductive and the capacitive range of compensation. For example, if the reactive current component to be compensated changes from the inductive into the capacitive area, the initially capacitive compensation current is attenuated in the reactive-current converter by a reduction in the pulse widths. Once the compensation current has reached its minimum in this manner, its phase is shifted by 180° and in the new phase position its amplitude is increased, by widening the current pulses, just to such an extent that the now capacitive reactive-current component of the system is compensated. As a result of this combination of pulse-width control and phase reversal, the reactive-current compensator according to the invention is provided with a nearly continuous control range.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Although the main field of application of the reactive-current compensator according to the invention lies in compensating reactive currents in three-phase systems and for this reason a three-phase current converter bridge is used in the compensator, the description following, in connection with a typical embodiment, is restricted for reasons of clarity to the simpler case of a single-phase alternating-voltage system. Those skilled in the art can transfer the implementation of the invention in a simple manner to the case of the three-phase system.

Figure 1:
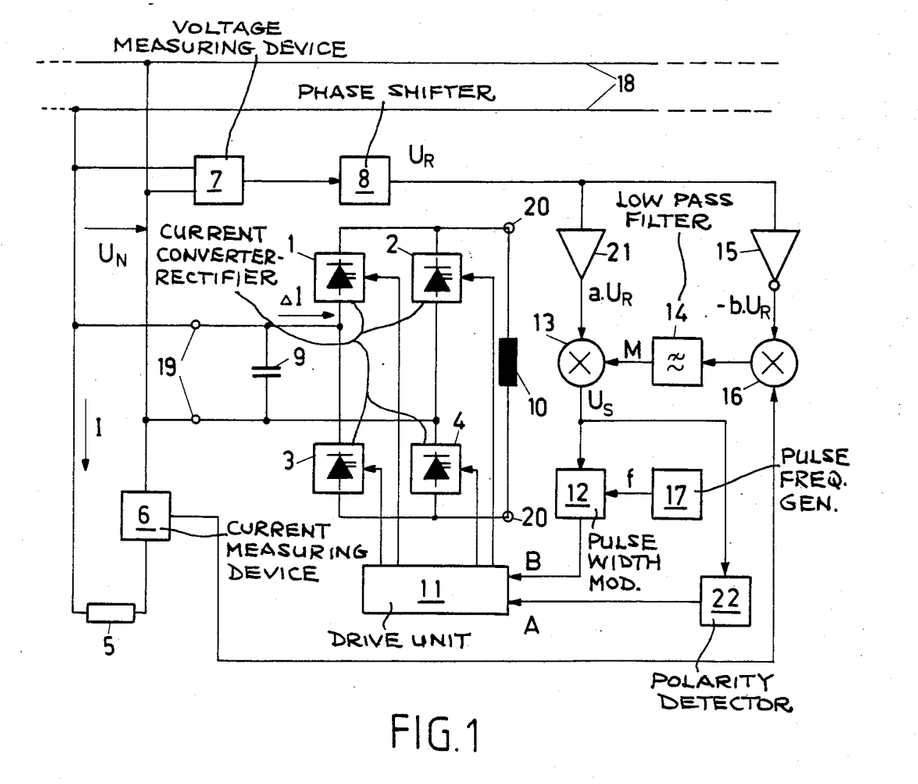
FIG. 1 is a block diagram of a typical embodiment of the reactive current compensator according to the invention.

Referring now to the drawings, wherein like reference numerals designate identical or corresponding parts throughout the several views, FIG. 1 shows the block diagram of a preferred embodiment of the reactive current compensator according to the invention. An alternating-voltage system 18 having a sinusoidal system voltage $U_N$ is connected to a load 5 through which a load current I flows which is also sinusoidal. The assumption is that the load current I is not in phase with the system voltage $U_N$.

In order to record the quantities I and $U_N$, a current measuring device 6 is provided in the feed lines to the load 5 and a voltage measuring device 7 is connected in parallel with the load 5. Both measuring devices are instrument transformers, known in themselves, such as are customarily used for monitoring supply systems and are familiar to those skilled in the art.

A current converter bridge circuit including forced-commutation current converter rectifiers 1, . . . , 4, an alternating-voltage input 19 and a direct-current output 20 is also connected in parallel with the load 5. The forced-commutation current converter rectifiers 1, . . . 4 are arranged in the individual branches of the bridge in such a manner that the current flowing at the direct-current output 20 has a defined resultant direction. This type of current converter bridge circuit, therefore, is also called an I converter.

The alternating-voltage input 19 is connected to the alternating-voltage system 18 whereas the direct-current output 20 is terminated by a smoothing choke 10. In parallel with the alternating-voltage input 19, an additional capacitor 9 is connected for protecting the current converter rectifiers 1, . . . 4, during the forced commutation.

The forced-commutation current converter rectifiers 1, . . . 4 are current converter rectifiers which can be switched on and off either as separate components or by suitable additional circuitry (commutation circuits) independently of the respective input voltage present at the bridge. It is particularly advantageous in this case to use gate turn-off thyristors (GTO) because these thyristors make it possible to simplify the construction of the reactive-power compensator since additional circuitry is not necessary.

The forced-commutation current converter rectifiers 1, . . . , 4 are connected via their control inputs to a drive unit 11 which provides suitable pulses for switching the rectifiers on and off in accordance with a predetermined timing plan. This timing plan is established by a sequence of logic pulses which are fed from a pulse width modulator 12 and a polarity detector 22 to pulse inputs A and B of the drive unit 11. The polarity detector 22 determines the polarity of a sinusoidal control voltage $U_S$ present at its input and supplies a signal corresponding to a logical "1" at its output if $U_S>0$ and a signal corresponding to a logical "0" if $U_S<0$. Simultaneously, the control voltage $U_S$ is also the modulation voltage for the pulse-width modulator 12, the pulse frequency f of which is predetermined by a pulse frequency generator 17.

The pulse-width modulator 12 used can be one of the circuits known from the field of pulse-width modulation in which, for example, a sawtooth signal of pulse frequency f, generated in the pulse frequency generator 7, is added to the modulation voltage and the sum signal is fed to a limit detector at the output of which the width-modulated pulses appear if the limit value is appropriately adjusted.

The control voltage $U_S$ is the product of a multiplication process in which in a first multiplier 13 an amplified reference voltage $a.U_R$ is multiplied by a multiplication factor M which assumes positive or negative values, depending on the phase relationship of the load current I. The multiplication factor M is the product of another multiplication process in which, in a second multiplier 16, an inverted reference voltage $-b.U_R$ is multiplied by the output signal of the current-measuring device 6 and the product is reduced to its direct-voltage component in a subsequent low-pass filter 14.

The amplified reference voltage $a.U_R$ and the inverted reference voltage $-b.U_R$ are derived via an amplifier 21 and an inverting amplifier 15, respectively, from a common reference voltage $U_R$ which is generated from the output signal of the voltage-measuring device 7 by producing a 90° phase shift in a phase shifter 8. The amplifiers 15 and 21 allow the reference voltages $a.U_R$ and $-h.U_R$ to be separately adjusted to values which are suitable for processing the signals in different ways. However, the amplifier 21 may also be omitted.

The operation of the reactive-power compensator becomes clear from the shape and the variation with time of the various signals and signal voltages occurring in the circuit according to FIG. 1. For the purpose of the explanation, it is assumed that the load 5 takes inductive reactive power from the alternating-voltage system 18, that is to say the load current I lags the system voltage $U_N$ by a phase angle of 0° less than $\phi \leq 90°$. The corresponding current and voltage vectors are shown in the vector diagram of FIG. 2. The vector of the load current I is rotated clockwise by the phase angle $\phi$ with respect to the vector of the system voltage $U_N$. The load current I can be vectorally split up into an active current component $I_W$ and a reactive current component $I_B$ which is to be compensated by the reactive-power compensator.

Figure 2:
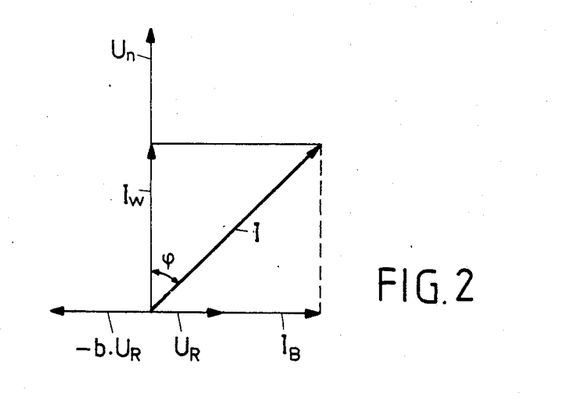
FIG. 2 is a vector diagram of the relative position of the various currents and voltages occurring in the circuit according to FIG. 1, FIGS. 3a, b are waveform diagrams illustrating the variation with time of the currents and voltages of FIG. 2.

In the present case of a lagging load current I, the reactive current component $I_B$ is parallel to the vector of the sinusoidal reference voltage $U_R$ which is delayed by 90° with respect to the system voltage $U_N$ by the phase shifter 8. If the load current I is leading, that is with a capacitive reactive power, the vector of the reactive-current component $I_B$, in contrast, is parallel to the inverted reference voltage $-b.U_R$.

Figure 3A:
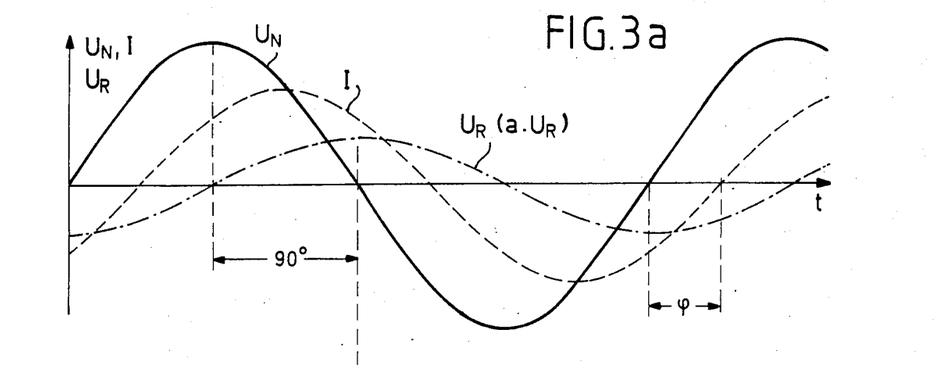
Figure 3B:
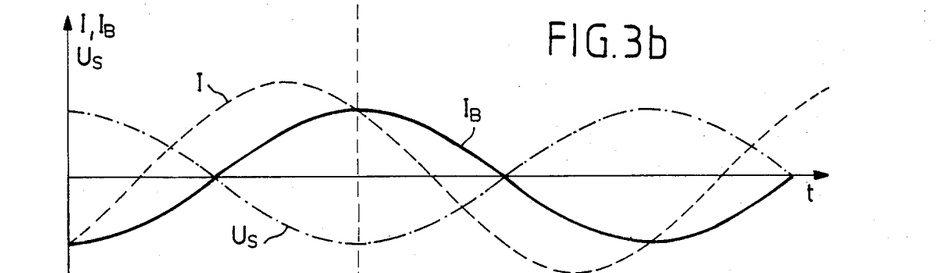

The variation with time of the voltages and currents is shown in FIGS. 3a and 3b. FIG. 3a shows the system voltage $U_N$ against time t, the load current I lagging by $\phi$ and the reference voltage $U_R$ lagging by 90°. The load current I is plotted again to the same scale in FIG. 3b in conjunction with its reactive-current component $I_B$ and the control voltage $U_S$ needed for the pulse-width modulator 12. The control voltage $U_S$ is always phase shifted by 180° with respect to the reactive current component $I_B$ and is thus in phase with a compensation current $\Delta I$ which is to be generated by the reactive power compensator and just compensates the reactive-current component $I_B$.

Since both the reference voltage $U_R$ and the amplified reference voltage $a.U_R$ have an amplitude which is constant with time and rigidly lags the system voltage $U_N$ by 90° in phase but the reactive-current component $I_B$ generally changes both its amplitude and its phase relationship between capacitive (+90°) and inductive (−90°), a corresponding tracking of the control voltage $U_S$ is affected by multiplying the amplified reference voltage $a.U_R$ by the multiplication factor M which has a variable magnitude and sign. If the reactive-current component $I_B$ is inductive, a negative sign at M generates the necessary control voltage $U_S$ phase shift of 180° with respect to $a.U_R$ and $I_B$. If the reactive-current component is capacitive, a positive sign at M leaves the phase unchanged since the necessary 180° phase shift already exists between $I_B$ and $a.U_R$.

The magnitude of M affects the amplitude of $U_S$ and thus, via the pulse-width modulator 12, also the amplitude of the resultant compensation current $\Delta I$. The magnitude is thus controlled as a function of the amplitude of the reactive-current component $I_B$ in such a manner that $\Delta I$ and $I_B$ balance as accurately as possible at any time. If, for example, the system voltage $U_N$ has the time-dependent form:

$$U_N = U°_N \sin \omega t \tag{1}$$

where $U°_N$ is the amplitude and $\omega$ is the angular frequency, according to FIG. 2 the following correspondingly applies to $U_R$, I and $I_B$:

$$U_R = U°_R \sin(\omega t - 90°) = -U°_R \cos \omega t \tag{2}$$

$$I = I° \sin(\omega t \pm \phi) \tag{3}$$

By multiplying the associated signal quantities from the voltage measuring device 7 and the current measuring device 6 in the second multiplier 16, the following is obtained:

$$-b \cdot U_R \cdot I = bU°_R I° \sin(\omega t \mp \phi)\cos\omega t \tag{4}$$

$$= \frac{1}{2} \cdot b \cdot U°_R I°(\sin(2\omega t \mp \phi) + \sin(\mp\phi))$$

After suppressing the component oscillating at the angular frequency 2 with the low-pass filter 14, the following direct-current signal component remains for the multiplication factor M:

$$\frac{1}{2} b \cdot U°_R I° \cdot \sin(\mp\phi) = \mp \frac{1}{2} bU°_R I° \cdot \sin\phi = \mp \frac{1}{2} bU°_R I°_B \tag{5}$$

where $I°_B = I° \cdot \sin \phi$ is the amplitude of the reactive-current component $I_B$.

A multiplication factor M which is proportional to this direct-current signal component from equation (5) has exactly the desired characteristics: if the reactive-current component is inductive $(-\phi)$ it is negative and if the reactive-current component is capacitive $(+\phi)$ it is positive and it is proportional to the amplitude $I°_B$ of the reactive-current component $I_B$. In this connection, the constant of proportionally is adjustable in a suitable manner by adjusting the steady state gain of the current-measuring device 6 and of the inverting amplifier 15.

Figure 3C:
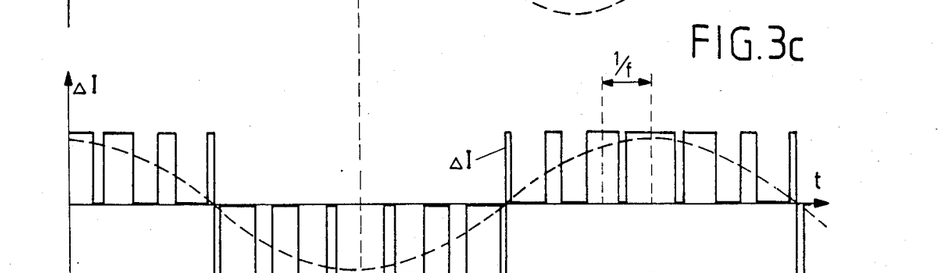
FIG. 3c is a waveform diagram illustrating the variation with time of the width-modulated compensation current.

In accordance with the control voltage $U_S$ predetermined by M and a.$U_R$, the current converter bridge circuit generates the compensation current $\Delta I$ in the form of sinusoidal width-modulated rectangular pulses are shown in FIG. 3c. The associated variation of the control for the forced-commutation current converter rectifier 1, ..., 4 is shown underneath in FIG. 3d in which the hatched areas in each case designate the period in which the corresponding current converter rectifier is switched on. At time $t_2$, for example, the two current converter rectifiers 1 and 4 are simultaneously on so that, from this time on, first a positive compensation current $\Delta I$ flows at the alternating voltage input 19 and simultaneously through the smoothing choke 10 as established in FIG. 1. At time $t_2$, the current converter rectifier 1 is switched off and, instead, the current converter rectifier 2 is switched on whilst the current converter rectifier 4 remains on as before. The compensation current $\Delta I$ is 0 until the current converter rectifier 1 is switched on again. In this break in the compensation current, $\Delta I$, the current converter rectifiers 2 and 4, which are on, form a free-wheeling branch for the smoothing choke 10 which, due to its stored energy, drives a direct current of unchanged magnitude through this free-wheeling branch. This alternation between $\Delta I$ pulses and free-wheeling periods is repeated at the pulse frequency f and changing timing ratios within the time interval $t_3$-$t_2$ at which the compensation current $\Delta I$ is positive. In the adjoining interval $t_2$-$t_1$, where the compensation current $\Delta I$ is negative, the roles of the current converter rectifiers 1 and 2 are interchanged, i.e., the negative current pulses fall into the on times of the current converter rectifier 2 whilst the current converter rectifiers 1 and 3 together form the free-wheeling branch.

FIGS. 3a-d represent the control sequence for an inductive reactive current component $I_B$. If the reactive current component is capacitive, $I_B$, $U_S$ and $\Delta I$ are shifted in phase by 180°. The positive $\Delta I$ pulses then fall into the time interval $t_2$-$t_1$ so that the control times of the current converter rectifiers are also correspondingly interchanged.

Figure 3D:
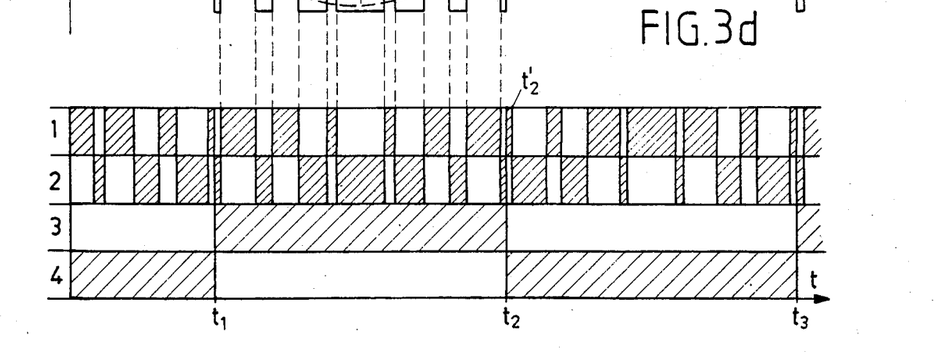
FIG. 3d is a waveform diagram illustrating the variation with time of the control signal for the forced-commutation current converter rectifiers for a compensation current according to FIG. 3c.
Figure 4:
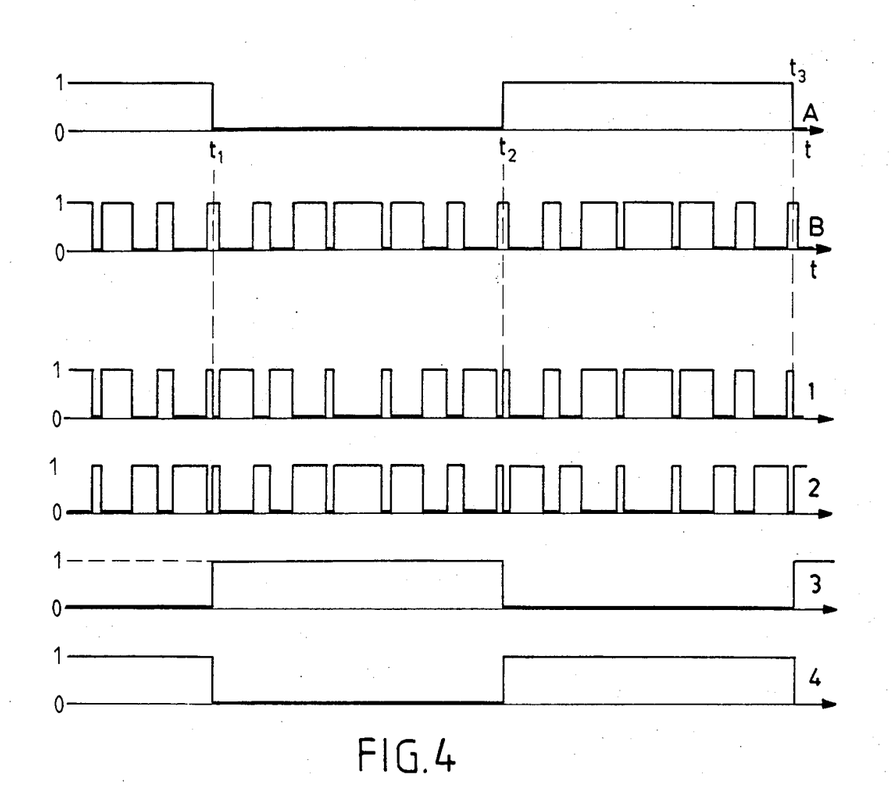
FIG. 4 is a timing diagram illustrating the variation with time of the logic pulses in a drive unit according to FIG. 1 for a compensation current according to FIG. 3c.

For the control sequence of the forced-commutation current converter rectifiers 1, ..., 4 to occur in accordance with FIG. 3d, suitable logic pulses from the pulse-width modulator 12 and the polarity detector 22 are needed at the pulse inputs A and B of the drive unit. These logic pulses are shown in the two upper rows of FIG. 4. The sequence of logic pulses output by the polarity detector 22 alternates at each change of polarity of the control voltage $U_S$ at times $t_1$, $t_2$ and $t_3$ from a logical "1" to a logical "0", and conversely. The sequence emitted by the pulse width modulator 12 consists of all positive sinusoidal width-modulated logic pulses. This can be achieved, for example, by first supplying the control voltage $U_S$ in the pulse-width modulator 12 to a full-wave rectifier and only then using it for the actual pulse-width modulation.

Figure 5:
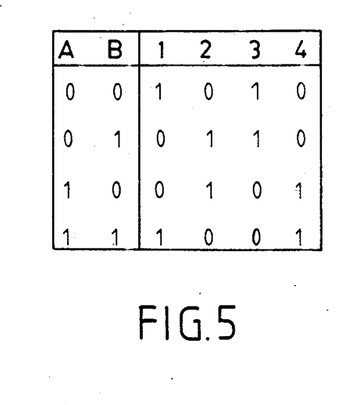
FIG. 5 is a truth table for the logic operations of the logic pulses according to FIG. 4.

The logic pulses present at the pulse inputs A and B are combined in the drive unit 11 in accordance with the truth table shown in FIG. 5. If, for example, both pulse inputs A and B are at a logical "0", a logical "1" is output to the outputs associated with the current converter rectifiers 1 and 3 whilst the outputs for the current converter rectifiers 2 and 4 are at a logical "0". In this manner, four different output pulse sequences are generated from the input pulse sequences of A and B and are shown in the four lower lines of FIG. 4, each of which is associated with one current converter rectifier. Each time interval in one of these output pulse sequences from FIG. 4 in which the signal is at a logical "1" corresponds to a hatched interval shown in FIG. 3d.

Figure 6:
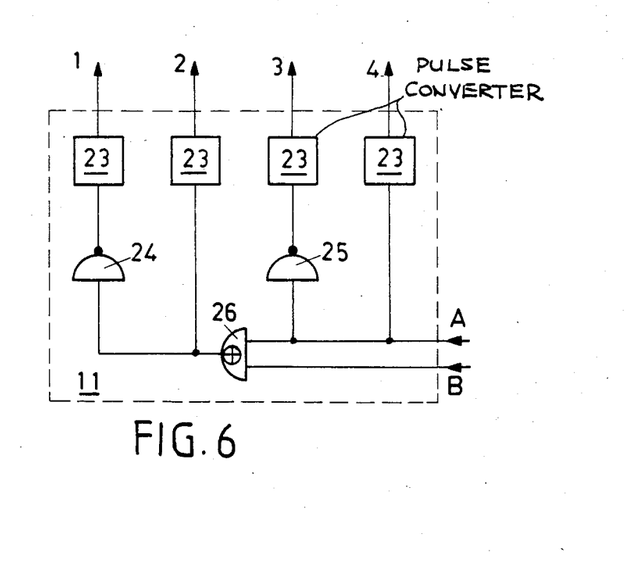
FIG. 6 is a circuit diagram of the typical embodiment of a drive unit according to FIG. 1.

A suitable drive unit 11 circuit configuration ensuring the required logical operations is shown in FIG. 6. The logic pulses of the pulse inputs A and B are supplied to an XOR gate (exclusive OR) 26, the output of which, on the one hand, goes directly via a pulse converter 23 to the control input of the current converter rectifier 2 and, on the other hand, is connected via a first inverter 24 at an identical pulse converter 23 to the control input of the current converter rectifier 1. From the pulse input A, two other lines lead via a second inverter 25 and a pulse converter 23 or directly via a pulse converter 23 to the current converter rectifiers 3 and 4, respectively.

The pulse converters 23 are of identical construction for all outputs and generate suitable drive pulses for the forced-commutation current converter rectifiers 1, ..., 4 from the logic pulses, for example by differentiation. The drive pulses are of such a nature that the associated current converter rectifier is switched on with a transition from a logical "0" to logical "1" whilst the current converter rectifier is extinguished with a jump from a logical "1" to a logical "0". The circuit engineering of the pulse converters 23 depends on the ignition and turn-off characteristics of the current converter rectifiers used and is known to those skilled in the art.

Overall, the invention results in a reactive power compensator which provides, with small constructional effort, a rapid, constant and flexible compensation of the reactive current components occurring in an alternating-voltage system.

In this arrangement, the higher the pulse frequency f the smaller the size which can be selected for the smoothing choke 10 and the capacitor 9. For this reason, it is advantageous to set this pulse frequency to be much higher than the frequency of the system voltage $U_N$ but especially higher than 10 kHz. In this manner, the expenditure of passive components is kept low by utilizing the possible switching frequencies, for example in the case of gate turn-off thyristors.

Figure 7:
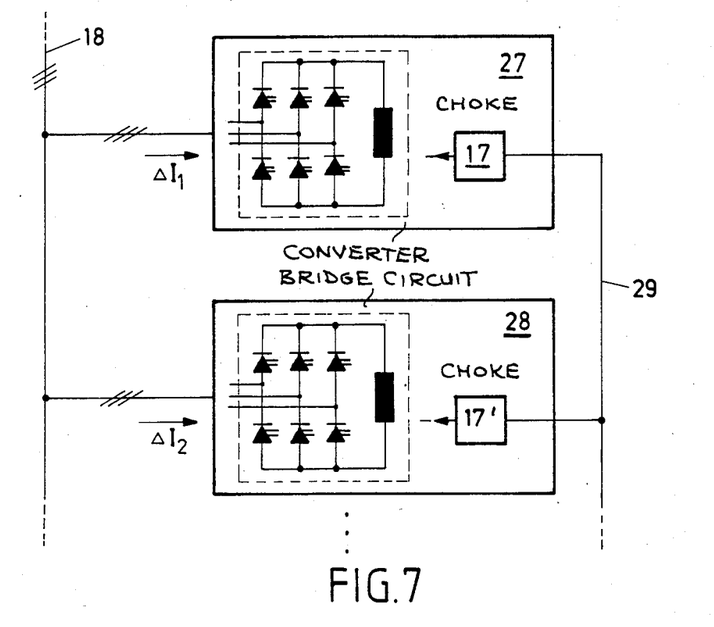
FIG. 7 is a circuit diagram illustrating the arrangement of two current converter bridges with offset timing at the three-phase system.

A further reduction in the content of harmonics in the compensation current $\Delta I$ can be achieved by connecting, as shown in FIG. 7, several current converter bridge circuits 27, 28 in parallel with the alternating-voltage system 18 and timing these bridge circuits with an offset. In this case, the alternating-voltage system is indicated as a three-phase system. Correspondingly, the current converter rectifiers of each current converter bridge circuit 27, 28 are arranged in a three-phase full-wave bridge as indicated in the dashed boxes of FIG. 7.

For reasons of redundancy, the individual current converter bridge circuits 27 and 28 are in this arrangement constructed to be similar also with respect to their drive systems in accordance with FIG. 1 but it must be taken into consideration that, instead of the single-phase system voltage $U_N$ from FIG. 1, the three line-to-line voltages of the three-phase system taken by themselves are now used for control purposes.

Each of the current converter bridge circuits 27 and 28 supplies an associated compensation current $\Delta I_1$ and $\Delta I_2$ to the alternating-voltage system 18. Superimposition of the two compensation currents $\Delta I_1$ and $\Delta I_2$ then produces the resultant compensation current $\Delta I$.

In agreement with FIG. 1, both current converter bridge circuits 27, 28 are in each case associated with a pulse frequency generator 17 and 17'. The two pulse frequency generators 17 and 17' preferably generate the same pulse frequency f. Whilst in the two current converter bridge circuits 27 and 28 all other voltages used for control purposes have the same phase, a phase difference in the form of an offset angle $\beta$ (FIG. 8) referred to the pulse frequency f exists between the pulse sequences of the pulse frequency generators 17, 17'. This angle is achieved by synchronization line 29 which connects and synchronises the two pulse frequency generators 17 and 17', taking into consideration the offset angle $\beta$.

Figure 8:
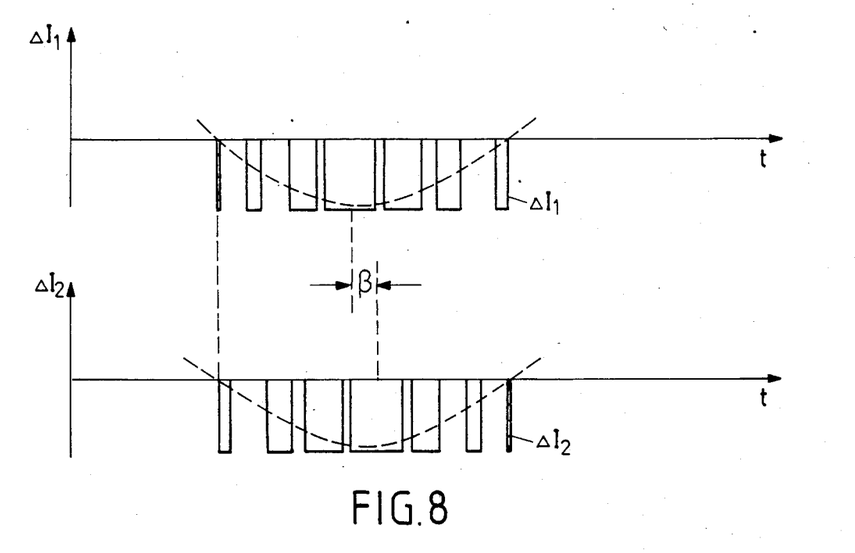
FIG. 8 is a waveform diagram illustrating the phase shift of the pulses of the compensation currents with an offset timing as shown in FIG. 7.

The pulse sequences of the compensation currents $\Delta I_1$ and $\Delta I_2$ of the two current converter bridge circuits 27 and 28 are then also offset by the offset angle $\beta$, for example 36°, in accordance with FIG. 8. The offset angle $\beta$ is preferably selected in such a manner that certain particularly strong harmonic frequencies are severely attenuated by a mutual cancellation in the resultant compensation current (at $\beta = 36°$ the harmonic with five times the fundamental).

By adding further current converter bridge circuits which are also timed with an offset and by a suitable selection of the various offset angles, several harmonics having different frequencies can be affected largely independently of each other. The offset angles can be selected in a simple manner by those skilled in the art in accordance with a Fourier analysis of the compensation current pulses.

Obviously, numerous additonal modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A reactive-power compensator for compensating a reactive-current component in an alternating-voltage system, comprising:
    at least one current converter bridge circuit having an alternating-voltage input which is to be connected to each branch of the alternating-voltage system and a direct-current output, including plural forced-commutation current converter rectifiers coupled to each of the branches of the alternating-voltage system and arranged such that a defined current direction is produced at the direct-current output;
    a capacitor connected in parallel at the alternating-voltage input;
    a smoothing choke connected to the direct current output; and
    compensation means for driving the forced-commutation current converter rectifiers such that the current converter bridge circuit accepts at its alternating-voltage input a compensation current ($\Delta I$) in the form of approximately rectangular current pulses having a pulse frequency (f) which is greater than the frequency of the alternating-voltage system, said current pulses having a polarity and a width modulated in accordance with a sine function so that a fundamental frequency component of the compensation current ($\Delta I$) is identical in frequency and amplitude with respect to a reactive-current component at said alternating-voltage input but shifted in phase by 180°;
    wherein said compensation means comprises,
    a drive unit for applying control pulses to said rectifiers, and
    a pulse-width modulator connected to said drive unit for applying thereto width-modulated pulses at the pulse frequency (f) in accordance with a control voltage ($U_S$) dependent on the magnitude and phase of the reactive-current component ($I_B$); and
    means for generating the control voltage ($U_S$), including a first multiplier which multiplies a reference voltage ($U_R$) which is shifted in phase by an angle of 90° with respect to a system voltage ($U_N$) of the alternating-voltage system by a multiplication factor (M), the magnitude of which is proportional to the magnitude of the reactive-current component ($I_B$) and which changes its sign when the reactive-current component ($I_B$) changes between an inductive and a capacitive range.

2. A reactive-power compensator according to claim 1, wherein said forced-commutation current converter rectifiers comprise:
    gate turn-off thyristors.

3. A reactive-power compensator according to claim 1, comprising:
    means for producing said reference voltage ($U_R$) based on the system voltage ($U_N$), including,
    a voltage measuring device for measuring the system voltage ($U_N$), and
    phase shifting means connected to said voltage measuring device for introducing a predetermined lag angle into an output signal from said voltage measuring device.

4. A reactive-power compensator according to claim 3, comprising:
    means for generating the multiplication factor (M), including,
    an inverting amplifier for amplifying said reference voltage ($U_R$),
    a current measuring device for measuring the load current (I) flowing through a load located at the alternating-voltage system and for outputting an alternating-voltage signal corresponding in magnitude and phase to the load current (I), and
    a second multiplier having a first input connected to an output of said inverting amplifier and a second input connected to the alternating-voltage signal output by said current measuring device.

5. A reactive-power compensator according to claim 1, wherein said pulse frequency (f) is greater than 10 kHz.

6. A reactive-power compensator according to claim 5, comprising:
    means for establishing the offset angle ($\beta$) such that when the compensation currents ($\Delta I_1$, $\Delta I_2$) are superimposed, the superimposed compensation currents ($\Delta I_1$, $\Delta I_2$) have a harmonics content which assumes a minimum value.

7. A reactive-power compensator for compensating a reactive-current component in an alternating-voltage system, comprising:
    a plurality of current converter bridge circuits each having an alternating-voltage input which is connected to a respective branch of the alternating-voltage system and a direct-current output, wherein plural of said current converter bridge circuits are connected in parallel to each branch of the alternating-voltage system, said current converter bridge circuits including forced-commutation current converter rectifiers coupled to the branches of the alternating-voltage system and arranged such that a defined current direction is produced at the direct-current output;

a capacitor connected in parallel at the alternating-voltage input of each current converter bridge circuit;

a smoothing choke connected to the direct current output of each current converter bridge circuit; and compensation means for driving the forced-commutation current converter rectifiers such that each current converter bridge circuit accepts at its alternating-voltage input a compensation current ($\Delta I$) in the form of approximately rectangular current pulses having a pulse frequency (f) which is greater than the frequency of the alternating-voltage system, said current pulses having a polarity and a width modulated in accordance with a sine function so that a fundamental frequency component of the compensation current ($\Delta I$) is identical in frequency and amplitude with respect to a reactive-current component at said alternating-voltage input but shifted in phase by 180°;

wherein each of the current converter bridge circuits connected in parallel to the same branch of the alternating voltage system accepts a respective compensation current ($\Delta I_1$, $\Delta I_2$) in the form of current pulses and the current pulses of the compensation currents ($\Delta I_1$, $\Delta I_2$) have the same frequency (f) but are mutually offset by a predetermined offset angle ($\beta$).

* * * * *